United States Patent Office 3,386,524
Patented June 4, 1968

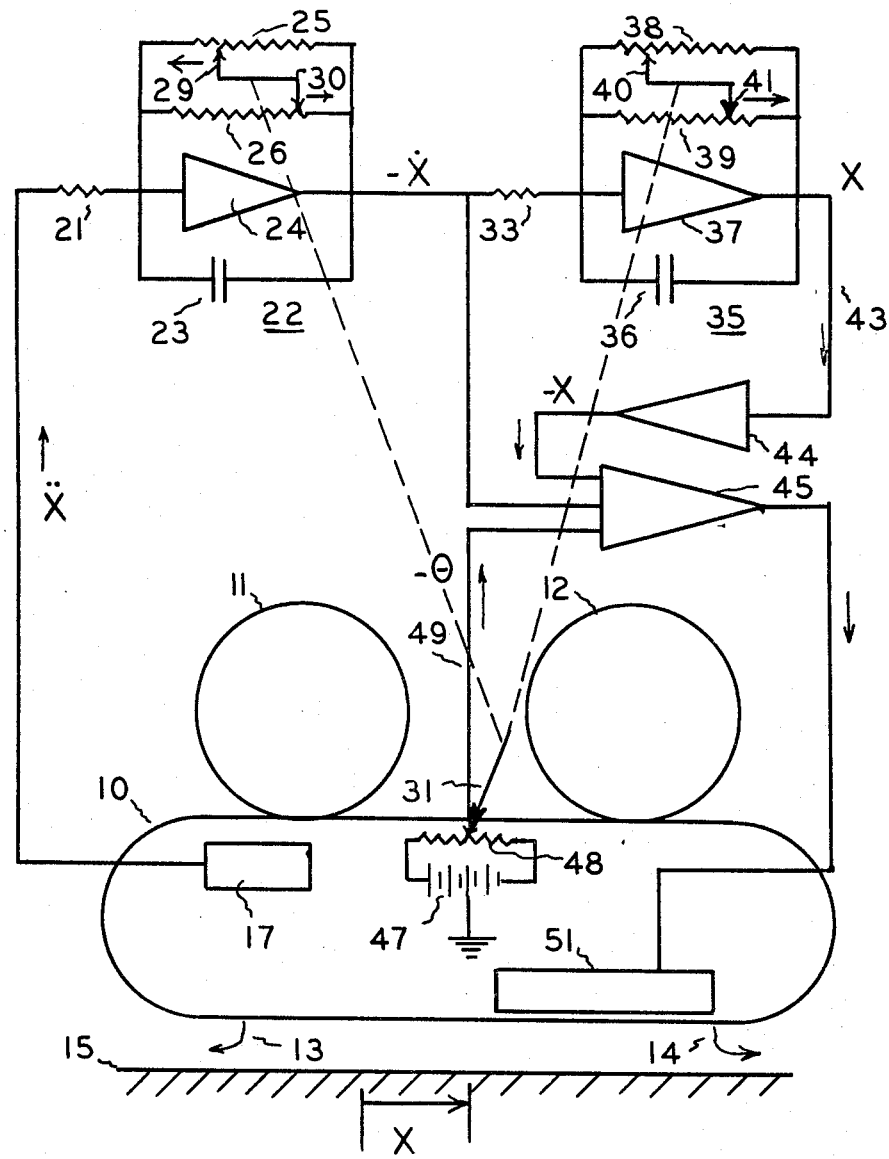

3,386,524
DRIFT STABILIZER FOR GROUND
EFFECTS MACHINE
James B. Tiedemann, Lawrence, Kans., assignor, by mesne
assignments, to the United States of America as represented by the Secretary of the Navy
Filed June 30, 1965, Ser. No. 468,651
9 Claims. (Cl. 180—117)

ABSTRACT OF THE DISCLOSURE

The improved control system for a ground effects machine disclosed by this application includes a lateral acceleration sensor for sensing lateral drift and producing a signal in response thereto, means for processing the signal to provide a group of signals including a negative velocity signal, a distance signal and a control signal that are fed into an amplifier circuit for controlling a lateral motion device. The control signals being reduced in magnitude as the controlling action is being performed to counteract the lateral drift.

---

This invention relates to an improved navigational system and more specifically to a drift stabilizer for a ground effects machine.

The ground effects machine, a relatively recent development in the field of vehicle transportation, is a radically different craft than the normal type of air supported airplane and helicopter. The device operates on the principle of an increased air pressure directed immediately below a relatively flat vehicle, which air pressure supports the vehicle several inches above the ground or water over which it is travelling. The speed of travel is relatively slow in any direction and the maneuverability is a sensitive item. A pilot must be an extremely competent individual and must be prepared to encounter certain differences of operation over the normal flying vehicle.

For example, the configuration of the ground effects machine is such that a sideways motion is produced when a relatively low velocity cross wind is encountered. Attempts to reduce the cross-sectional area of the ground effects machine which is subject to such wind produce little improvement when a given load is designed for. One of the problems that a pilot is confronted with is the lateral movement, due to such a wind, and his compensating for such motion without overcompensating. The piloting of a ground effects machine in many respects is similar to that of a ship in that in turning a ship the rudder must be brought amidships before the turn is completed or else the ship will go beyond the desired heading. In a similar situation, the compensation for a lateral thrust of the wind must be such that the vehicle, as it approaches the proper compensation it should have a reduced control developed so that when the machine has reached the desired heading in a given wind condition the net changing signal for the vehicle is zero.

It is therefore an object of this invention to provide an improved control system for a ground effects machine.

It is yet a further object of this invention to provide an improved ground effects machine control circuit which senses the lateral acceleration and velocity of a ground effects machine and compensates therefore.

It is a further object of this invention to provide a ground effects machine control system which accumulatively accounts for the lateral acceleration of a machine and the pilot's control operation.

It is still a further object of this invention to provide a circuit which provides acceleration, velocity and distance proportional signals which coupled with a control signal provide the necessary control of a ground effects machine to give it a smooth, non-overshooting lateral characteristic.

It is yet still another object of this invention to provide a reset contact in a ground effects machine to compensate for positive control signals developed when the pilot gives a lateral direction to the machine.

It is still another object of this invention to provide an improved control instrument for a ground effects machine, comprising; a first means for sensing lateral acceleration and for producing a first signal in proportion thereto; a second means coupled to the first means for integrating a portion of the first signal and for producing a second signal; a third means coupled to the second means for integrating a portion of the second signal and for producing a third signal; a fourth means, including a control member, for controlling the lateral motion of the ground effects machine and for producing a fourth signal in proportion to the lateral control; and a fifth means coupled to receive signals from the second means, third means, and the fourth means to produce a lateral thrust to provide motion to the ground effects machine.

Other objects, advantages and novel features of the invention will become apparent from the following detailed description of the invention when considered in conjunction with the accompanying drawing wherein the figure is a somewhat schematic presentation of a ground effects machine incorporating the invention.

The ground effects machine generally designated as 10 in this instance, has a pair of fans 11, 12 capable of directing a large quantity of air flow through the vehicle in a downward direction as shown by the arrows 13, 14. An increase of air pressure is developed and the machine is maintained above ground level 15, a predetermined amount. In normal operation the pilot would direct the machine in the direction in which he wishes to proceed and motion in that direction would be accomplished. In the event that a wind force is encountered which is from the side there is motion of the machine which a first means or an accelerometer 17 would sense and develop a first signal which is shown as $\ddot{X}$. This signal is fed through a resistor 21 to a second means or a drift velocity accumulator and drift velocity reset circuit as shown generally by 22. Incorporated therein is a capacitor 23, an amplifier 24, and a pair of resistors 25, 26; all coupled in shunt with each other and producing a second signal shown as a negative velocity signal $\dot{X}$ as an output signal. A pair of movbale contacts 29 and 30 coupled to a control stick 31 effectively by-pass portions of the resistance 25, 26 in a manner as hereinafter described.

A third means or circuit is coupled by a resistor 33 to the second means and is a drift reset and a drift accumulator generally designated by 35. That circuit includes a capacitor 36, an amplifier 37, and a pair of resistors 38, 39 all connected in shunt. As in the drift velocity reset circuit, a pair of movable contacts 40, 41 are coupled to the control stick 31 to provide a varying amount of resistance. The output of this circuit along line 43 is a third signal and is designated as X which is a distance measurement. An amplifier 44 receives the signal X and converts it to a negative signal X as an output which is fed to an amplifier 45. The control stick 31 is connected to a fourth means or circuit which includes a battery 47 and a resistor 48 and produces a fourth signal along line 49 designated as negative $\ominus$ which is a control signal put into the system by a pilot to accomplish the correction for the sideward thrust.

The three signals, negative X, negative $\dot{X}$ and negative $\ominus$ go through a summing amplifier 45 to a control circuit 51. The output of circuit 51 is a force to overcome the side thrust as hereinafter described.

The capacitor 23 and amplifier 24 in the drift velocity accumulator circuit 22 receive a signal dependent upon the lateral acceleration of vehicle 10 and stores this signal building it to an ever larger amount. Thus, the signal $-\dot{X}$ which is produced is an increasing signal. This, of course, is understandable since as long as there is a lateral acceleration of a positive nature there will be an increase in velocity.

In a similar manner capacitor 36 and amplifier 37 which produce a signal whose output corresponds with lateral distance moved, really is adding up the lateral velocities and of course this signal will increase as time goes on.

The function of the two circuits which are substantially similar, that is the resistors 25, 26 with the movable contacts 29, 30 and the resistors 38, 39 with movable contacts 40, 41, is to reduce this signal developed by these two circuits 22 and 35 when the pilot takes corrective action. Hence, the movable contacts are respectively opposite in motion and since the vehicle may be subjected to lateral forces in either direction they are in effect center tapped. That is, when there is no lateral control applied by the pilot of the vehicle there is no signal output and the two movable taps would be at a center portion of the resistors.

Obviously many modifications and variations of the present invention are possible in the light of the above teachings. It is therefore to be understood that within the scope of the appended claims the invention may be practiced otherwise than as specifically described.

I claim:
1. An improved control for a ground effects machine, comprising:
   (a) a first means for sensing lateral acceleration and for producing a first signal in proportion thereto;
   (b) a second means coupled to said first means for integrating a portion of said first signal and for producing a second signal;
   (c) a third means coupled to said second means for integrating a portion of said second signal and for producing a third signal;
   (d) a fourth means, including a control member, for controlling the lateral motion of said ground effects machine and for producing a fourth signal in proportion to said control members' controlling action of said ground effects machine; and
   (e) a fifth means coupled to receive signals from said second means, third means, and said fourth means to produce a lateral thrust to provide motion to said ground effects machine.

2. An improved control for a ground effects machine, comprising:
   (a) a first means for sensing lateral acceleration and for producing a first signal in proportion thereto;
   (b) a second means coupled to said first means for integrating a portion of said first signal and for producing a second signal in proportion to the velocity of said machine;
   (c) a third means coupled to said second means for integrating a portion of said second signal and for producing a third signal in proportion to the distance said machine has traveled;
   (d) a fourth means, including a control member, for controlling the lateral motion of said ground effects machine and for producing a fourth signal in proportion to said control members' controlling action of said ground effects machine; and
   (e) a fifth means coupled to receive signals from said second means, third means, and said fourth means to produce a lateral thrust to provide motion to said ground effects machine.

3. An improved control for a ground effects machine, comprising:
   (a) a first means for sensing lateral acceleration and for producing a first signal in proportion thereto;
   (b) a second means coupled to said first means for integrating a portion of said first signal and for producing a second signal in proportion to the velocity of said machine;
   (c) a third means coupled to said second means for integrating a portion of said second signal and for producing a third signal in proportion to the distance said machine has traveled;
   (d) a fourth means, including a control member, for controlling the lateral motion of said ground effects machine and for producing a fourth signal in proportion to said control members' controlling action of said ground effects machine; and
   (e) a fifth means coupled to receive signals from said second means, third means, and said fourth means to produce a lateral thrust to provide motion to said ground effects machine, said second and third signals being fed in proportion to the amount of said control signal.

4. The control of claim 3 wherein, means are coupled between said third means and said fifth means to convert said third signal to a negative value.

5. The control of claim 4 wherein there is provided means, including at least two resistors in shunt having center taps mechanically coupled to said controlling means, for proportioning said second signal to said fourth signal, are coupled to said second means.

6. The control of claim 5 wherein there is provided means, including at least two resistors having movable taps mechanically coupled to said controlling means in shunt with said third means, for proportioning said third signal to said fourth signal.

7. The control of claim 6 wherein said second means includes a summing circuit to accumulate said first signal.

8. The control of claim 7 wherein said third means includes a summing circuit to accumulate said second signal.

9. An improved control system for a ground effects machine, comprising:
   (a) a lateral sensing accelerometer for developing a first signal proportional to lateral acceleration of said ground effects machine;
   (b) a drift velocity accumulator coupled to receive said first signal and to produce a second negative velocity signal;
   (c) a second drift accumulator coupled to receive said second signal and to produce a third signal proportional to lateral distance;
   (d) a first amplifier coupled to receive said third signal and converting it to a fourth negative signal;
   (e) a circuit including a movable member which is capable of developing a fifth signal which is proportional to the motion of said member; and
   (f) a second amplifier coupled to receive said second, fourth, and fifth signals having an output which controls a lateral thrust member to counteract the lateral acceleration of said ground effects machine.

References Cited

UNITED STATES PATENTS 3,012,180   12/1961   Finvold _____ 244—77

A. HARRY LEVY, *Primary Examiner.*